United States Patent
Rembach et al.

(10) Patent No.: US 8,457,819 B2
(45) Date of Patent: *Jun. 4, 2013

(54) COMPUTER READABLE MEDIUM FOR OPERATING A VESSEL

(75) Inventors: Paul F. Rembach, Houston, TX (US); Greg Castleman, Kemah, TX (US)

(73) Assignee: C-Mar Group Holdings Ltd., St. Helier, Jersey (JE)

( * ) Notice: Subject to any disclaimer, the term of this patent is extended or adjusted under 35 U.S.C. 154(b) by 376 days.

This patent is subject to a terminal disclaimer.

(21) Appl. No.: 12/832,943

(22) Filed: Jul. 8, 2010

(65) Prior Publication Data

US 2012/0109450 A1    May 3, 2012

Related U.S. Application Data

(63) Continuation-in-part of application No. 12/313,732, filed on Nov. 24, 2008, now Pat. No. 7,980,905.

(60) Provisional application No. 61/004,397, filed on Nov. 25, 2007.

(51) Int. Cl.
*G06F 17/00* (2006.01)

(52) U.S. Cl.
USPC .......................................................... 701/21

(58) Field of Classification Search
USPC ................ 701/21, 36, 99; 440/2, 6, 7, 84
See application file for complete search history.

(56) References Cited

U.S. PATENT DOCUMENTS

| | | | |
|---|---|---|---|
| 5,131,341 A * | 7/1992 | Newman | 114/39.21 |
| 5,131,875 A | 7/1992 | Lee | |
| 5,510,659 A | 4/1996 | Lewis et al. | |
| 6,000,353 A | 12/1999 | De Leu | |
| 6,132,267 A | 10/2000 | Campbell | |
| 8,197,291 B2 * | 6/2012 | Rembach et al. | 440/6 |
| 2004/0242088 A1 | 12/2004 | McCann | |
| 2005/0269988 A1 | 12/2005 | Thrap | |
| 2008/0064273 A1 * | 3/2008 | Mizokawa | 440/1 |
| 2008/0129050 A1 | 6/2008 | Guey et al. | |
| 2009/0176417 A1 | 7/2009 | Rembach et al. | |
| 2010/0094490 A1 | 4/2010 | Alston et al. | |

* cited by examiner

*Primary Examiner* — Kim T Nguyen
(74) *Attorney, Agent, or Firm* — Buskop Law Group, PC; Wendy Buskop

(57) ABSTRACT

One or more embodiments of a computer readable medium having computer instructions stored thereon for operating a vessel are provided. The computer readable medium can include computer instructions for monitoring a DC source; computer instructions for determining the most efficient power source to power a vessel; computer instructions for controlling an AC power source to allow transfer of power solely from the DC power source to power the vessel, transfer of power solely from the AC power source to power the vessel; or transfer of power from both the AC power source and the DC power source to power the vessel; computer instructions to determine when the DC power source is at a predetermined level; and computer instructions for controlling auxiliary devices of the vessel.

11 Claims, 8 Drawing Sheets

COMPUTER READABLE MEDIUM FOR OPERATING A VESSEL

CROSS REFERENCE TO RELATED APPLICATIONS

This application is a Continuation-in-Part of Co-pending U.S. patent application Ser. No. 12/313,732, filed on Nov. 24, 2008, which claims the benefit of the filing date of U.S. Provisional Patent Application Ser. No. 61/004,397, filed Nov. 25, 2007. The disclosures of these applications are incorporated herein by reference.

FIELD

The present embodiments relate to a computer readable medium that has a computer instructions stored thereon for operating a vessel.

BACKGROUND

A need exists for a computer readable medium that has a computer instructions stored thereon that can allow operation of the vessel utilizing both AC power supplies, such as generators, and DC power supplies such as battery banks.

A further need exists for a computer readable medium that has a computer instructions stored thereon that can determine the most efficient power source to power the vessel and automatically draw power from the most efficient power source.

In addition, a need exits for a computer readable medium that has a computer instructions stored thereon that operates a vessel in a manner that reduces carbon emissions and the cost of operating the vessel by reducing fuel consumption.

Furthermore, a need exits for a computer readable medium that has a computer instructions stored thereon that enables additional power sources to be used to operate the vessel in the event that contaminated fuel is taken aboard is needed.

The present embodiments meet these needs.

BRIEF DESCRIPTION OF THE DRAWINGS

The detailed description will be better understood in conjunction with the accompanying drawings as follows.

Figure 1:
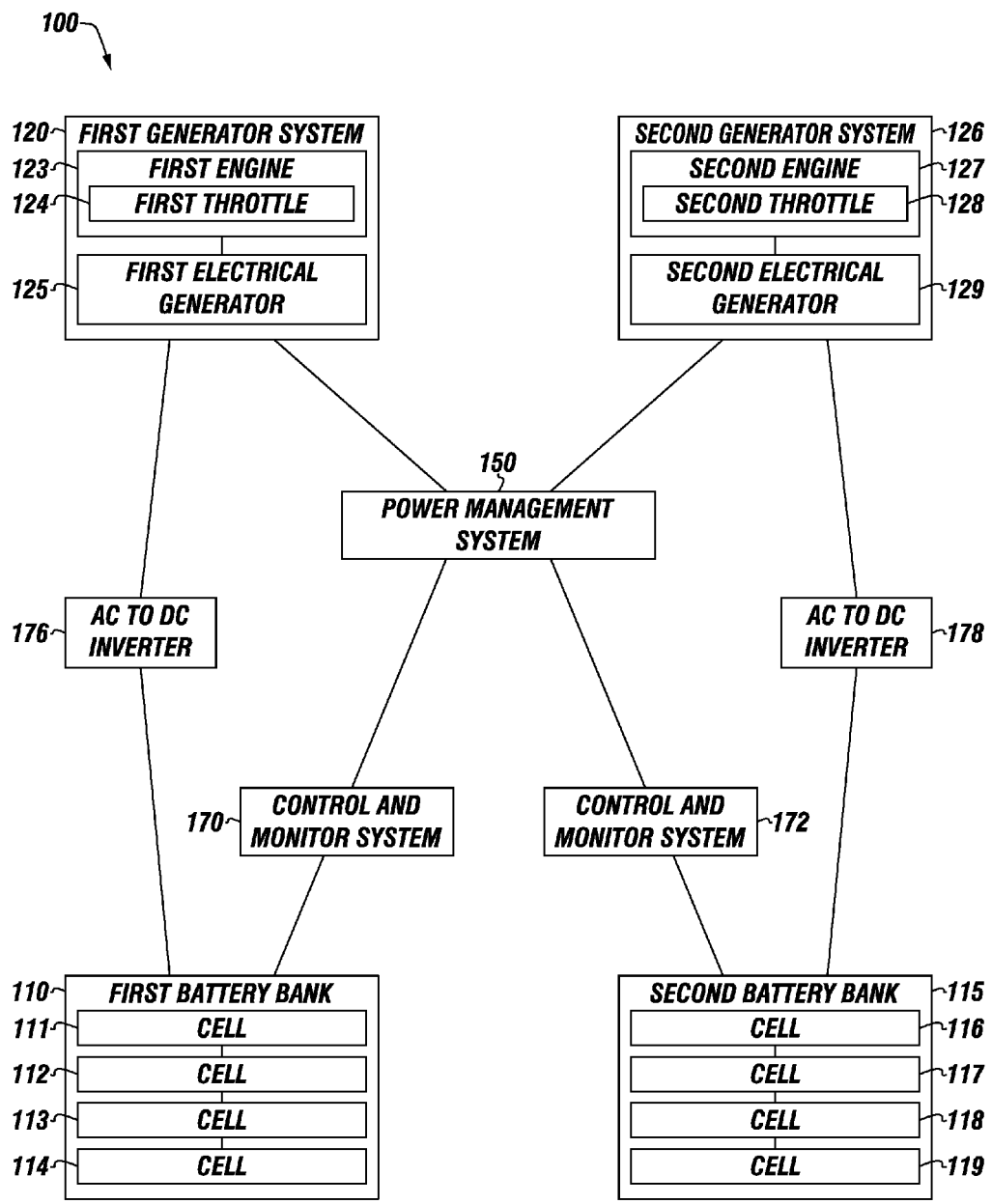
FIG. 1 depicts a schematic of an illustrative power system having a power management system according to one or more embodiments.

The present embodiments are detailed below with reference to the listed Figures.

DETAILED DESCRIPTION OF THE EMBODIMENTS

Before explaining the present computer readable medium in detail, it is to be understood that the computer readable medium is not limited to the particular embodiments and that it can be practiced or carried out in various ways.

The present embodiments generally relate to a computer readable medium having computer instructions stored thereon for operating a vessel.

Operating the vessel can include managing certain aspects of the vessel. The aspects of the vessel can be the power system, propulsion system, and vessel service loads. The computer instructions can allow for automated management of a portion or all of the components of the vessel. The computer instructions can be used in conjunction with manual operation of one or more components of the vessel.

Illustrative embodiments of the computer readable medium can have computer instructions stored thereon for operating a vessel. The computer instructions can include computer instructions for monitoring a DC source. The computer readable medium can also have computer instructions for determining the most efficient power source to power a vessel, and computer instructions for controlling an AC power source to allow transfer of power solely from the DC power source to power the vessel, transfer of power solely from the AC power source to power the vessel; or transfer of power from both the AC power source and the DC power source to power the vessel.

The computer readable medium can also have computer instructions to determine when the DC power source is at a predetermined level, computer instructions for controlling auxiliary devices of the vessel, and computer instructions for monitoring the amount of power needed for all loads.

The computer readable medium can also have computer instructions for comparing the power needed for all loads against each individual power source and computer instructions for comparing the result to the state of charge of the battery system and comparing load curves of the AC power source to a mathematical model of the power management efficiency system.

The comprising computer instructions for varying the out put of the AC power source and varying the output voltage of the stored energy battery system when the required load of the AC power source is less than 50 percent of the maximum rating The computer readable medium can also include computer instructions for synchronizing the AC power source with an additional AC power source and computer instructions for harvesting energy from electrical rotating sources.

One or more embodiments of the computer readable medium can having computer instructions stored thereon that allows or aids in the performance of one or method of operating a vessel.

An illustrative method can include determining the most efficient power source from a plurality of power sources for operating the vessel. The plurality of power sources can include one or more battery banks and one or more AC power sources.

Determining the most efficient power source from a plurality of power sources for operating the vessel can include monitoring the amount of power needed for all loads. The loads can include auxiliary equipment, such as winches, pumps, thrusters, hotel loads, and navigation equipment.

Determining the most efficient power source from a plurality of power sources can also include comparing the state of charge of the battery banks and comparing load curves of the AC power sources to the required load to optimize the carbon fuel intake of the engine. For example, if one or more engines of one of the AC power sources online are operating at more than 5 percent outside of its optimized load curve, the engine speed and generator voltage can be adjusted to bring the engine into an optimized operational state. The optimized load curve is supplied by the engine manufacture based on carbon emission levels and fuel efficiency.

The battery banks can include one or more cells, and the AC power sources can include shore power, one or more generators, or combinations thereof.

In one or more embodiments, the battery cells within the battery banks can be maintained within a preset limit of one another. The preset limit can be when the state of charge of cells is within from about 3 percent to about 5 percent of one another. The balancing of the battery cells can include monitoring the voltage of each individual cell and transporting energy from the highest charged cell to the lowest charged cell to equalize all cells. The energy can be transported by selectively opening or closing one or more electrical pathways.

The most efficient power source can be determined by comparing the actual load against the state of charge of the battery banks and the available power that can be supplied from the AC power sources.

The method can also include drawing power from the most efficient power source to operate the vessel. The drawing of power from the most efficient power source can be controlled by a power management system, such as illustrated below. In one or more embodiments, the power management system can control the voltage output from one or more AC power sources to provide the most efficient power source.

For example, the AC power output can be increased to prevent current flow from the battery banks, decreased such that power is drawn solely from one or more battery banks, or balanced with the available power in the battery bank such that the power is drawn from one or more AC power sources and one or more battery banks.

The method can also include harvesting energy from electrical rotating sources. The electrical rotating sources can include winches, pumps, thrusters, or combinations thereof. The harvested energy can be transferred back to the battery banks, used to power the vessel, or both. For example, if a thruster is slowed down or stopped, water introduces a negative torque onto the propeller that can be converted into electrical energy and provided back into the system. One or more inverters in communication with the battery bank can allow for bi-directional flow of the harvested energy. The power management system can monitor the direction of the electrical energy.

The method can include monitoring the battery bank. For example, the power management system can be in communication with one or more sensors that are acquiring data related to one or more battery banks. The sensors can include temperature sensors, such as resistive thermo devices; voltage sensors, such as volt meters; current sensors, such as amp meters; or other sensors.

Monitoring the battery bank can include communicating sensors with each cell; acquiring output voltage for all the cells and the voltage output of each cell, and acquiring current of the battery bank output; and the temperature of each cell.

The state of charge of the individual cells and the battery bank can be determined using a manufacturer provided table that can be integrated with the power management system.

The method can also include charging the battery bank when the charge of the battery bank drops below a preset limit. The preset limit can be a state of charge of 10 percent, 20 percent, 30 percent, 40 percent, 50 percent, 60 percent, or 80 percent. The preset limit can be determined by the type of battery used and the manufacture specification. The battery banks can be charged by the harvested energy, one or more AC power sources, one or more external power source, or a combination thereof. The battery banks can be placed in a charge state when the AC powers sources are at an output greater than the stored potential power in the battery banks For example, when the battery banks reaches a preset limit, for example 50 percent charge, the AC output is increased thereby preventing energy draw from the battery bank and providing a portion of the AC power to the battery bank.

In one or more embodiments, the vessel can be operated by solely using the battery bank. This is an advantage because it eliminates noise associated with the operation of the vessel, reduces carbon emissions, and reduces costs associated with fuel consumption.

In one or more embodiments, the method can also include automatically switching to the AC power supply when the battery bank reaches the predetermined state of charge. Accordingly, the one or more AC power supplies can be used to operate the vessel when the battery bank reaches the predetermined state of charge and one or more battery banks can be recharged.

In one or more embodiments of the method, the vessel can be operated using power from two AC power sources, and the AC power sources can be automatically synchronized with one another. The AC power sources can be synchronized with one another using the power management system. For example, the power management system can include computer instructions for controlling the engine speed for each of the AC power sources and controlling the voltage output of each of the generators, and computer instruction for ensuring synchronization of the sinusoidal output of each generator.

As the vessel is operated with one or more AC power sources, the state of charge of one or more battery banks can be managed. Accordingly the state of charge of the battery banks can be concurrently managed as the vessel is powered by one or more of the AC power sources.

In one or more embodiments of the method, the AC power source can be operated to provide a constant voltage. For example, the AC power source can be a generator system. The generator system can include an engine and a generator. Accordingly, the engine can be operated at a constant rotational speed, and the generator can provide a constant voltage. Accordingly, a constant power load can be maintained on the engine by controlling the rotational speed of the engine and the voltage from the generator. This can be used to allow for servicing and maintenance of the battery banks.

In one or more embodiments, the engine can be operated at a varying rotational speed and the generator can provide a variable voltage output.

The embodiments of the method disclosed herein can be performed using a system. An illustrative system can include a plurality of power sources, wherein at least one of the power sources provides AC power and at least another of the power sources provides DC power. The power sources can be in communication with a load.

The system can also include a power management system in communication with the load and power sources. The power management system can include a processor. The processor can be a microprocessor or any other type of processor.

A data storage can be in communication with the processor. The data storage can be or include a hard drive, a virtual hard drive, a flash drive, or other computer readable medium.

The data storage can have a plurality of computer instructions stored thereon for performing one or more embodiments of the method described herein and as further explained below.

The power management system can control or instruct a control system. The control system can be an analog or digital control system. The control system can include hardware for operating or controlling the loads of the vessel, the power output of the AC power source, and the battery banks.

The power management system can also include an operator interface to limit the total amount of power that can be utilized over a period of time. The operator interface can limit the amount of power that can be utilized over a period of time based on the power source reserves.

Turning now to the Figures, FIG. 1 depicts a schematic of an illustrative power system having a power management system according to one or more embodiments. The system 100 for operating a vessel can include a plurality of power sources for operating the vessel. The plurality of power sources can include one or more DC power sources (two DC powers sources are depicted as battery banks 110 and 115). The plurality of power sources can also include one or more AC power sources (two AC power sources are depicted as generator systems 120 and 122). The system 100 can also include a power management system 150.

The first battery bank 110 can include one or more cells (four are shown 111, 112, 113, and 114). The cells 111, 112, 113, 114 can be connected in parallel or series. The cells 111, 112, 113, 114 can be in communication with a first control and monitor system 170.

The second battery bank 115 can include one or more cells (four are shown 116, 117, 118, and 119). The cells 116, 117, 118, 119 can be connected in parallel or series. The cells 116, 117, 118, 119 can be in communication with a second control and monitor system 172.

The control and monitor systems 170 and 172 can be in communication with the power management system 150. An illustrative control and monitor system is described in more detail below.

The first generator system 120 can include a first engine 123, such as a diesel or natural gas engine. The first engine 123 can have a first throttle 124 in communication with the power management system 150. The first generator system 120 can also include a first electrical generator 125 that is driven by the first engine 123.

The second generator system 122 can include a second engine 127. The second engine 127 can have a second throttle 129 in communication with the power management system 150. The second generator system 126 can also include a second electrical generator 128 that is driven by the second engine 127.

The first electrical generator 125 can be in communication with the first battery bank 110 by a first AC to DC inverter 176. The second electrical generator 127 can be in communication with the second battery bank 115 by a second AC to DC inverter 178. The AC to DC inverters 176 and 178 can be passive or active. The AC to DC inverter can be any commercially available AC to DC inverter.

The power management system 150 can be in communication with the control and monitor systems 170 and 172 and the generator systems 120 and 126. The power management system 150 is described in more detail in FIG. 2.

Figure 2:
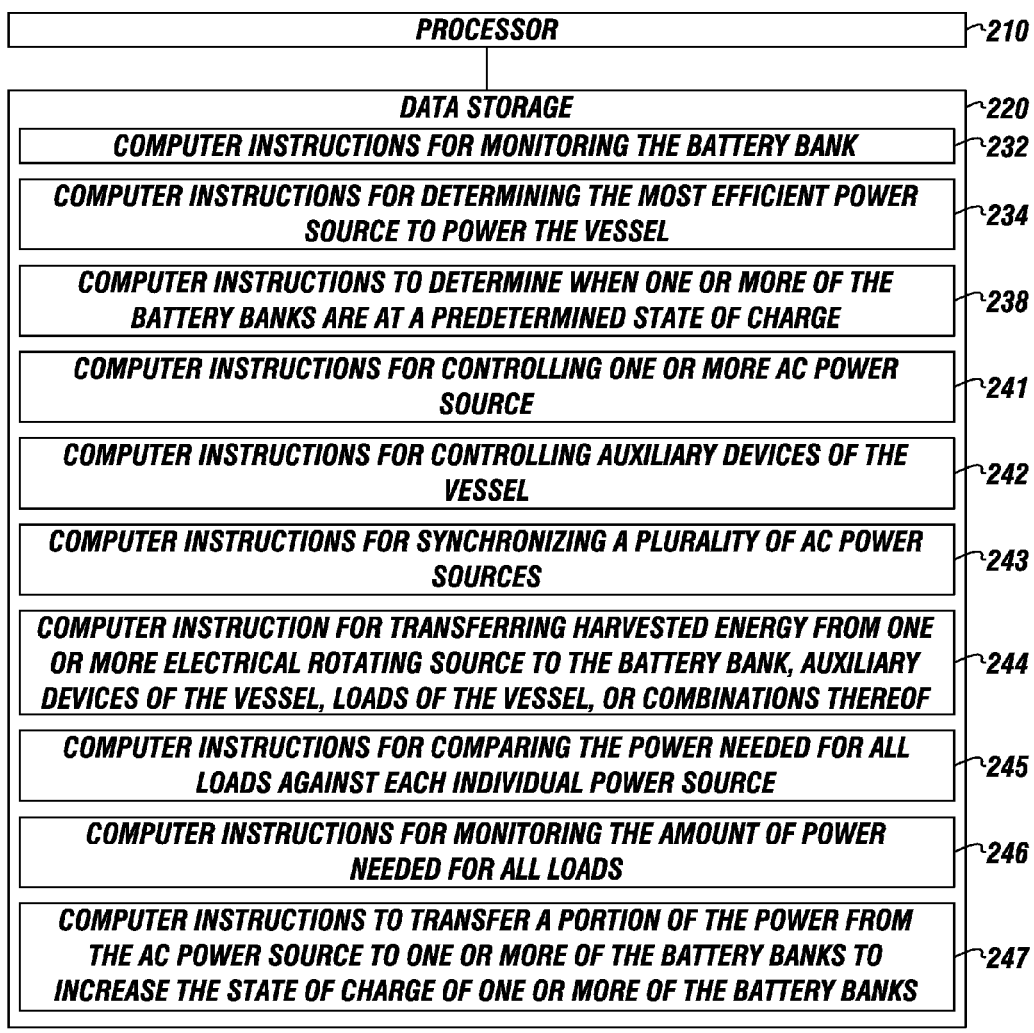
FIG. 2 depicts a schematic of the illustrative power management system of FIG. 1.

Turning now to FIGS. 1 and 2. FIG. 2 depicts a schematic of the illustrative power management system 150 according to one or more embodiments. The power management system 150 can include a processor 210, a data storage 220, and a plurality of computer instructions 230.

The processor 210 can be a processor or a microprocessor. For example, the processor 210 can be a personal computer, an Intel processor, a PLC, or the like. The processor 210 can be in communication with the data storage 220.

The data storage 220 can be a hard drive, a virtual hard drive, a flash drive, or other computer readable medium.

The plurality of computer instructions can be stored on the data storage 220. The plurality of computer instructions can include computer instructions for monitoring the battery bank 232, computer instructions for determining the most efficient power source to power the vessel 234, computer instructions to determine when one or more of the battery banks are at a predetermined state of charge 238, computer instructions for controlling one or more AC power source 241, computer instructions for controlling auxiliary devices of the vessel 242, and computer instructions for transferring harvested energy from one or more electrical rotating source to the battery bank, auxiliary devices of the vessel, loads of the vessel, or combinations thereof 244, computer instructions for comparing the power needed for all loads against each individual power source 245, computer instructions for monitoring the amount of power needed for all loads 246, and computer instructions to transfer a portion of the power from one or more AC power source to one or more of the battery banks to increase the state of charge for one or more of the battery banks 247.

The computer instructions for monitoring the battery bank 232 can determine the state of charge of the battery banks using data from the control and monitor systems 170 and 172.

Computer instructions for determining the most efficient power source to power the vessel 234 can obtain information regarding the determined state of the battery banks. Accordingly, the computer instructions for determining the most efficient power source to power the vessel 234 can determine the state of the AC power sources; determine the state of the actual loads needed to power the vessel.

Consequently, the information determined by the computer instructions for determining the most efficient power source to power the vessel 234 can be used to increase the efficiency of the power system by instructing the processor to increase the AC power output, decreasing the AC power output, or balancing the AC power output with the battery bank power output. For example, if the computer instructions for determining the most efficient power source to power the vessel 234 determines that the most efficient power source is the battery banks 110 and 115, the computer instructions for determining the most efficient power source to power the vessel 234 can instruct the processor to adjust the generator systems 120 and 126, such that the vessel is only powered by the battery banks 110 and 115.

The computer instructions to determine when one or more of the battery banks are at a predetermined state of charge 238 can receive the determined state of charge from computer instructions for monitoring the battery bank 232 and compare the determined state of charge to a predetermined state of charge, which is provided by the manufacturer of the cells, and communicate this information to the computer instructions for determining the most efficient power source to power the vessel 234. Then the computer instructions for determining the most efficient power source to power the vessel 234 can tell the processor 210 to prevent transfer of energy from the battery banks 110 and 115 and to provide power from one or more of the generator systems 120 and 126 to charge the battery banks 110 and 115 if the determined state of charge is less the predetermined state of charge. Alternatively, if the determined state of charge is greater than the predetermined state of charge the computer instructions for determining the most efficient power source 234 can decrease the generator systems 120 and 126 power output to allow more power to be drawn from the battery banks 110 and 115.

The computer instructions to transfer a portion of the power from one or more AC power source to one or more of the battery banks to increase the state of charge for one or more of the battery banks 247 can cooperate with the computer instructions to determine when one or more of the battery banks are at a predetermined state of charge 238 and the computer instructions for monitoring the battery bank 232 to selectively instruct the processor 210 to form one or more electrical communication paths between the one or more of the battery banks 110 and 115 and one or more of the generator systems 120 and 126.

The computer instructions for controlling auxiliary devices of the vessel 242 can instruct the processor to initiate the operation of one or more pumps, one or more winches, or other auxiliary devices needed for critical operations on the vessel.

The computer instructions for transferring harvested energy from one or more electrical rotating source to the battery bank, auxiliary devices of the vessel, loads of the vessel, or combinations thereof 244 can determine the allowable amount of harvested energy that can be transferred back into the system and processor 210 can selectively open one or more current paths to allow the harvested energy to be transferred back into the system.

The computer instructions for comparing the power needed for all loads against each individual power source 245 can cooperate with the computer instructions for monitoring the amount of power needed for all loads 246 to sum or calculate all the power requirements of the vessel. The computer instructions for monitoring the amount of power needed for all loads 246 can instruct the processor to receive signals form one or more monitoring systems in communication with various components of the vessel to determine the required load. For example, the vessel can have one or more monitoring systems for monitoring service loads, and auxiliary device loads to determine the total load required.

Figure 3:
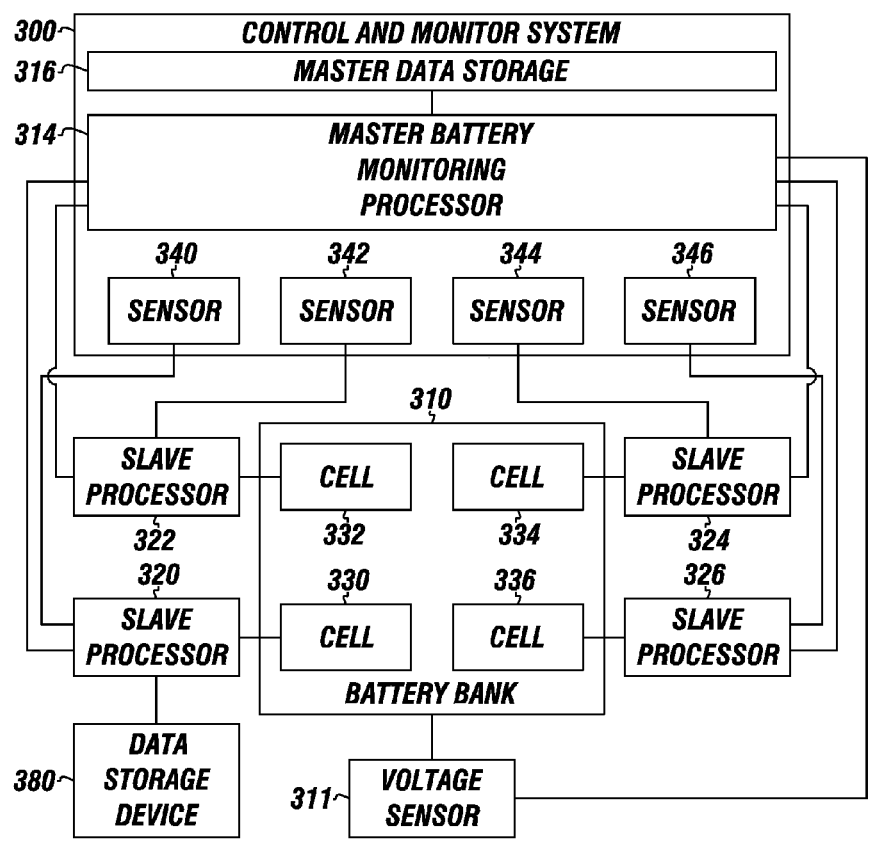
FIG. 3 depicts a schematic of a control and monitor system for a battery bank according to one or more embodiments.

FIG. 3 depicts a schematic of a control and monitor system for a battery bank according to one or more embodiments.

The control and monitor system 300 can include a master battery monitoring processor 314. The master battery monitoring processor 314 can be a microprocessor, an Intel processor, PLC, or the like.

The master battery monitoring processor 314 can be in communication with a master data storage 316. The master data storage 316 is described in more detail in FIG. 4.

The master battery monitoring processor 314 can be in communication with a voltage sensor 311. Other sensors can also be in direct communication with the master battery monitoring processor 314. The voltage sensor 311 can measure the power output of a battery bank 310.

The battery bank 310 can have one or more cells (four are shown 330, 332, 334, and 336). The cells can be any power cell such a lithium ion cells, acid based cells, or other commercially available cells.

The master battery monitoring processor 314 can be in communication with a plurality of slave processors 320, 322, 324, and 326. The first slave processor 320 can be in communication with a first cell 330. The second slave processor 322 can be in communication with a second cell 332. The third slave processor 324 can be in communication with a third cell 334. The fourth slave processor 326 can be in communication with a fourth cell 336.

The control and monitor system 300 can also include a plurality of sets of sensors 340, 342, 344, and 346. Each set of sensors 340, 342, 344, and 346 can be or include a voltage sensor, a temperature sensor, a current sensor, and other relevant sensors.

The first set of sensors 340 can be in communication with the first cell 330 and the first slave processor 320. The second set of sensors 342 can be in communication with the second cell 332 and the second slave processor 322. The third set of sensors 344 can be in communication with the third cell 334 and the third slave processor 324. The fourth set of sensors 346 can be in communication with the fourth cell 336 and the fourth slave processor 326.

The slave processors 320, 322, 324, and 326 can acquire data from the associated set of sensors 340, 342, 344, and 346. The slave processors 320, 322, 324, and 326 can provide the acquired data to the master battery monitoring processor 314. The master battery monitoring processor 314 can communicate the acquired data to the power management system.

The slave processors 320, 322, 324, and 326 can be in independent communication with a plurality of data storage devices 380. For clarity only one data storage device is depicted; however, similar data storage devices can be in communication with the other slave processors 320, 322, 324, and 326. The data storage device 380 is described in more detail in FIG. 5.

Figure 4:
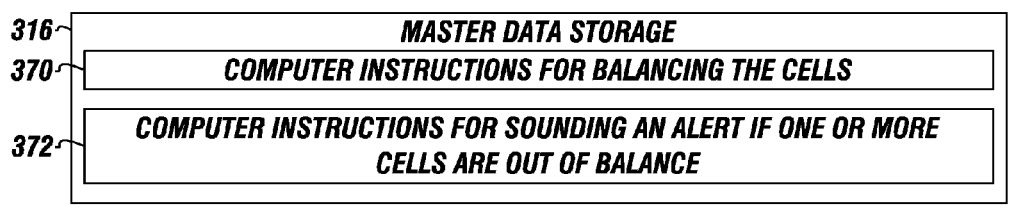
FIG. 4 depicts an illustrative embodiment of a master data storage according to one or more embodiments.

FIG. 4 depicts an illustrative embodiment of a master data storage according to one or more embodiments. The master data storage 316 can have computer instructions 370 for balancing the cells 330, 332, 334, and 336. For example, the computer instructions 370 can maintaining each cell 330, 332, 334, and 336 within a preset limit of one another by instructing the master battery monitoring processor 314 to selectively open and close electrical communication paths between the cells 330, 332, 334, and 336 to allow for transfer of energy from higher charged cells to lower charged cells. The master data storage 316 can also include computer instructions 370 for sounding an alert if one or more of the cells 330, 332, 334, and 336 are out of balance.

Figure 5:
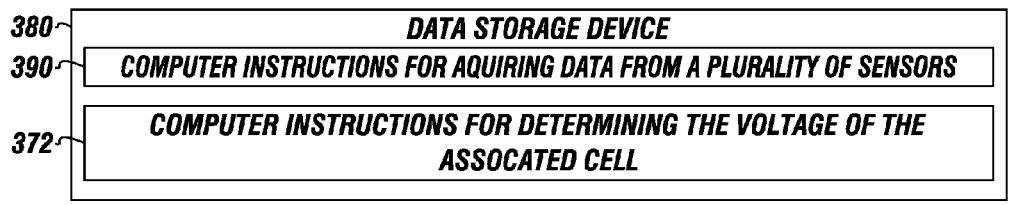
FIG. 5 depicts an illustrative embodiment of a data storage device in communication with a slave processor according to one or more embodiments.

FIG. 5 depicts an illustrative embodiment of a data storage device in communication with a slave processor according to one or more embodiments. The data storage device 380 can include computer instructions for acquiring data from the plurality of sensors 390 and computer instruction 392 for determining the voltage of the associated cell.

Figure 6:
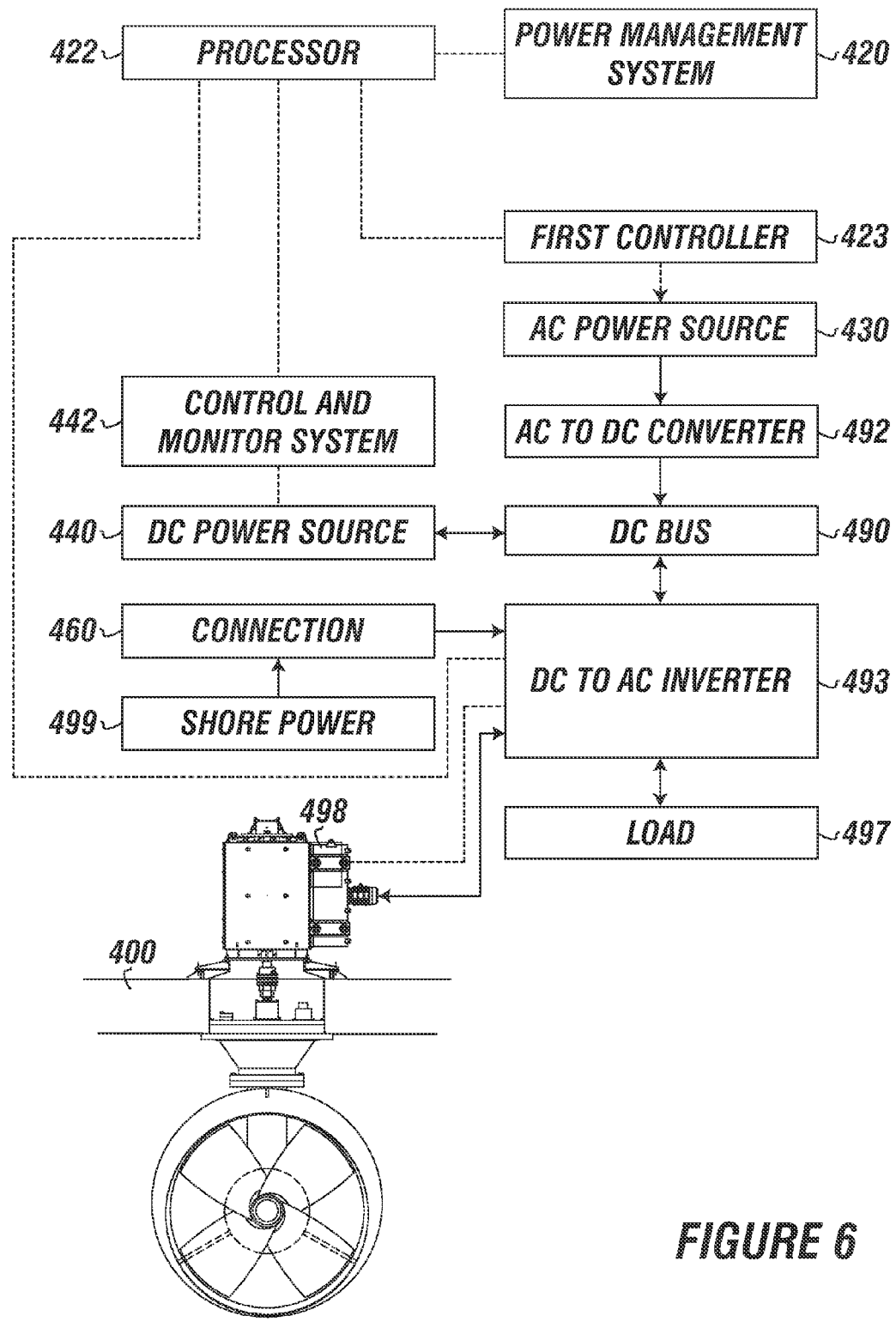
FIG. 6 depicts a vessel having an illustrative power system disposed thereon according to one or more embodiments.

FIG. 6 depicts a vessel having an illustrative power system disposed thereon according to one or more embodiments.

The power system can be disposed on a vessel 400. The vessel 400 can be a barge, tug boat, tanker, or other vessel. The power system can be similar to any one described herein. Accordingly, the power system can include a power management system 420, one or more AC power sources 430, and one or more DC power sources 440.

The power management system 420 can have a processor 422 in communication with one or more controllers for operating the vessel or critical elements of the vessel. For example, the processor 422 can be in communication with a first controller 423 for controlling the AC power source 430, a control and monitor system 442 for monitoring the DC power source 440. The power system can also include one or more auxiliary controllers for controlling one or more auxiliary devices, such as auxiliary device 498.

The AC power source 430 can be connected to a DC bus 490 by an AC to DC converter 492. The AC to DC can also be referred to as an AC to DC inverter. The AC to DC converter 492 can be any commercially available AC to DC converter.

The DC power source can be connected to the DC bus 490. The DC bus 490 can also be connected to a DC to AC inverter 493. The DC to AC inverter 493 can be bi-directionally connected to the DC bus 490. The DC bus 490 can be a commercially available DC bus and can have internal control systems.

In one or more embodiments the DC to AC inverter 495 can be connected or in communication with one or more auxiliary devices 498. The DC to AC inverter 495 can transfer harvested energy from the auxiliary device 498, such as an azimuth thruster, to the load or the DC power source 440. For example, the processor 422 can tell the DC to AC inverter 493 how much harvested energy can be transferred into the system, and the DC to AC inverter 493 can be selectively operated to allow energy harvested from the electrical rotating source of the auxiliary device 498 or other auxiliary devices to be transferred back to the DC power source 440, the load 497, or both. Illustrative DC to AC inverters can include those available from Siemens, such as Sinamics inverters; or other commercially available DC to AC inverter. The DC to AC 493 inverter can be bi-directionally connected to the connection auxiliary device 498, the load 497, and the DC bus 490.

The power system 410 can have a connection 460 for connecting to one or more external power sources (one external power source is depicted as shore power 499). The connection 460 can be in communication with the DC to AC inverter 493.

The processor 422 can be in communication with the first controller 423, the DC to AC inverter, the auxiliary device 498, and other components of the vessel 400.

Figure 7:
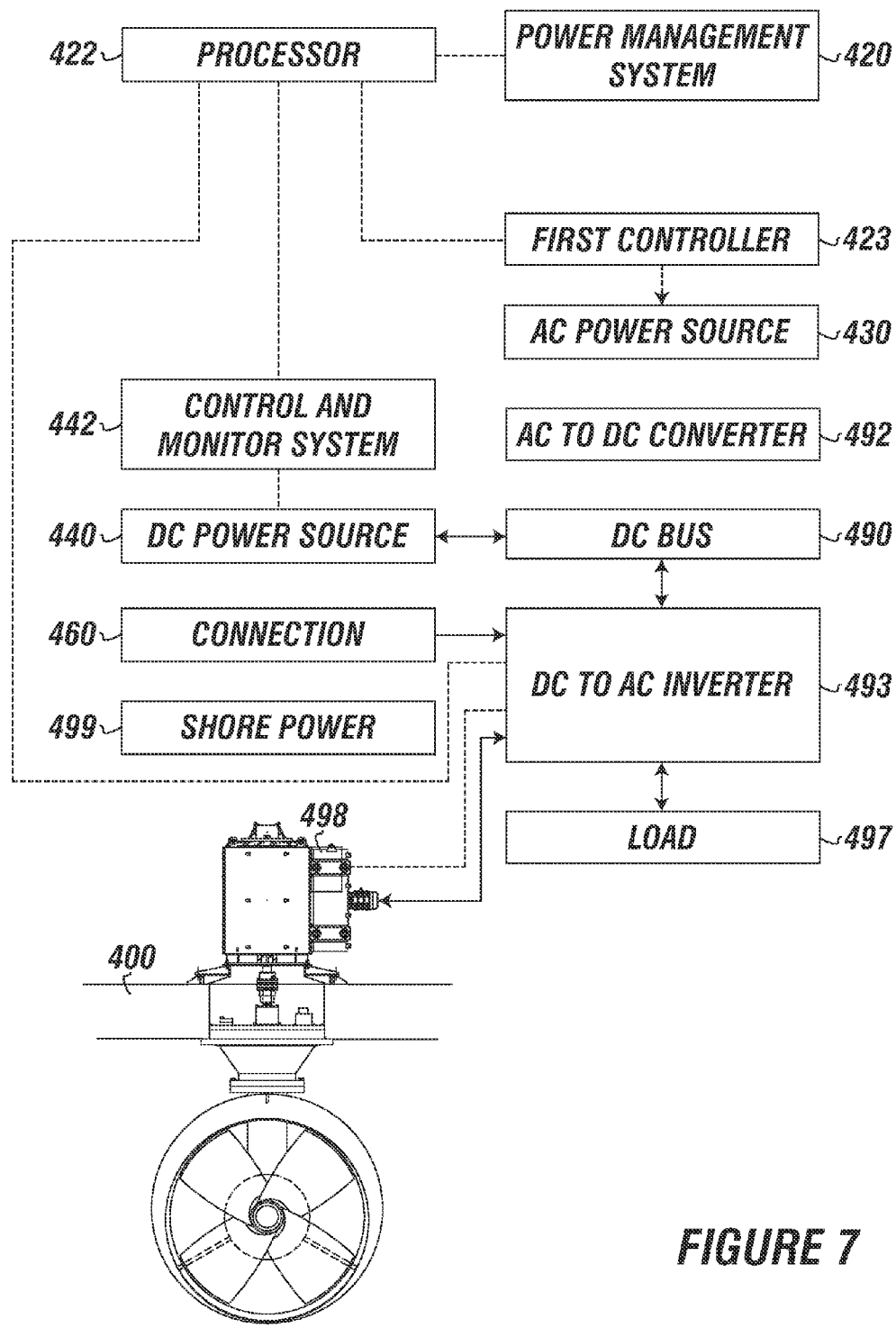
FIG. 7 depicts the vessel of FIG. 6 when the illustrative power system is in a stealth mode according to one or more embodiments.

FIG. 7 depicts the vessel of FIG. 4 when the illustrative power system is in a stealth mode according to one or more embodiments.

The power management system 420 can tell the first controller 423 to shut down the AC power source 430. Accordingly, the DC power source 440 can provide electricity to the loads required to operate the vessel 400.

Figure 8:
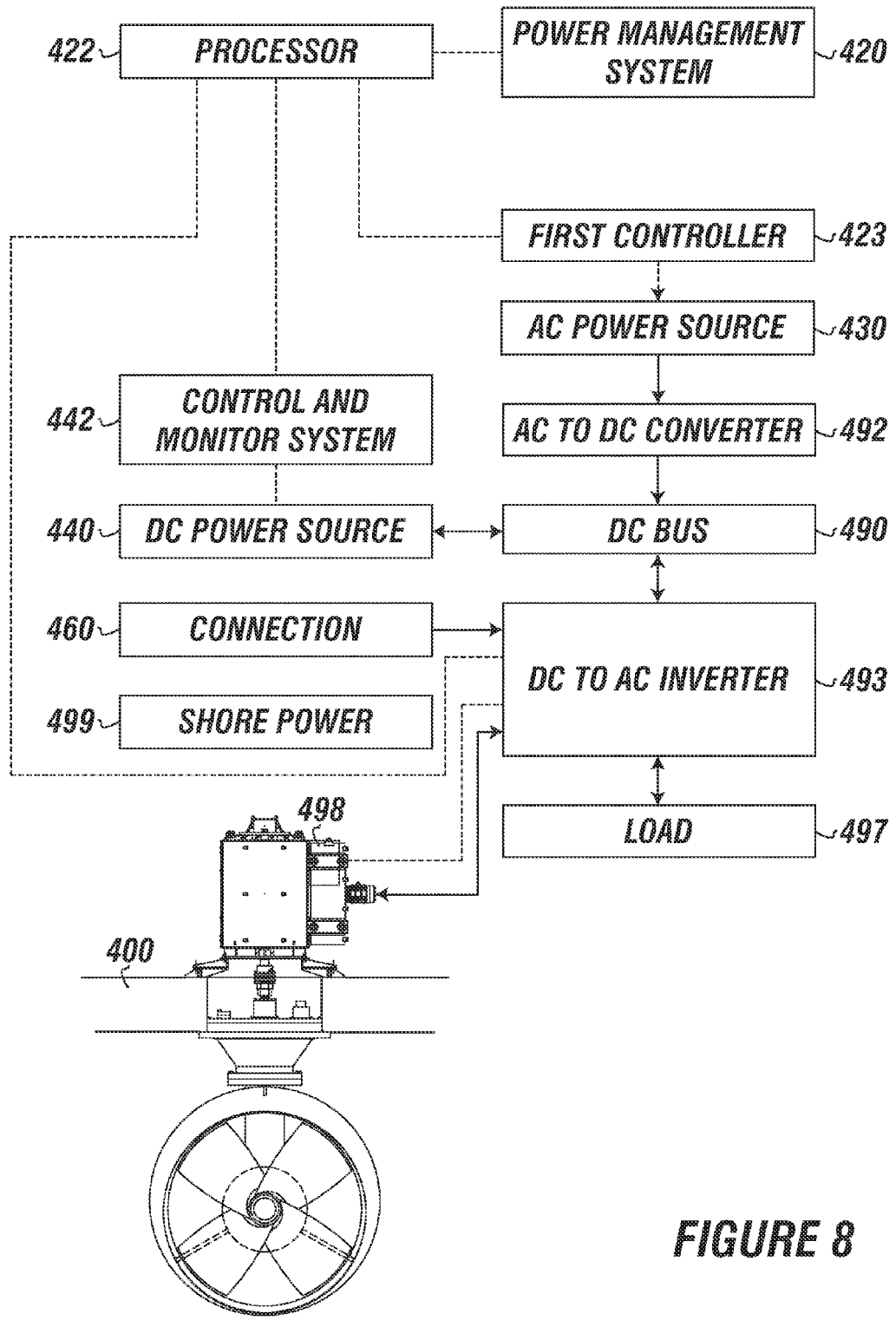
FIG. 8 depicts the vessel of FIG. 6 when the illustrative power system is in a hybrid mode combining both AC power and DC power according to one or more embodiments.

FIG. 8 depicts the vessel of FIG. 4 when the illustrative power system is in a hybrid mode combining both AC power and DC power according to one or more embodiments.

The power management system 420 can adjust the first controller 423 to adjust the power output of the AC power source 430. Accordingly, the AC power source 430 can be accelerated to increase the power output therefrom, allowing the AC power source 430 to provide power for the entire load required to operate the vessel 400. Furthermore, some of the power outputted from the AC power source 430 can be used to charge the DC power source 440.

In addition, energy harvested from the auxiliary device 498 can be used to power some of the load or to charge the DC power source 440.

In addition, in this mode the processor 422 can selectively instruct the first controller 423 to manipulate the AC power source 430 such that the power output from the AC power source is balanced with the DC power source 440 to allow for both the AC power source and the DC power source 440 to power the critical components of the vessel.

Figure 9:
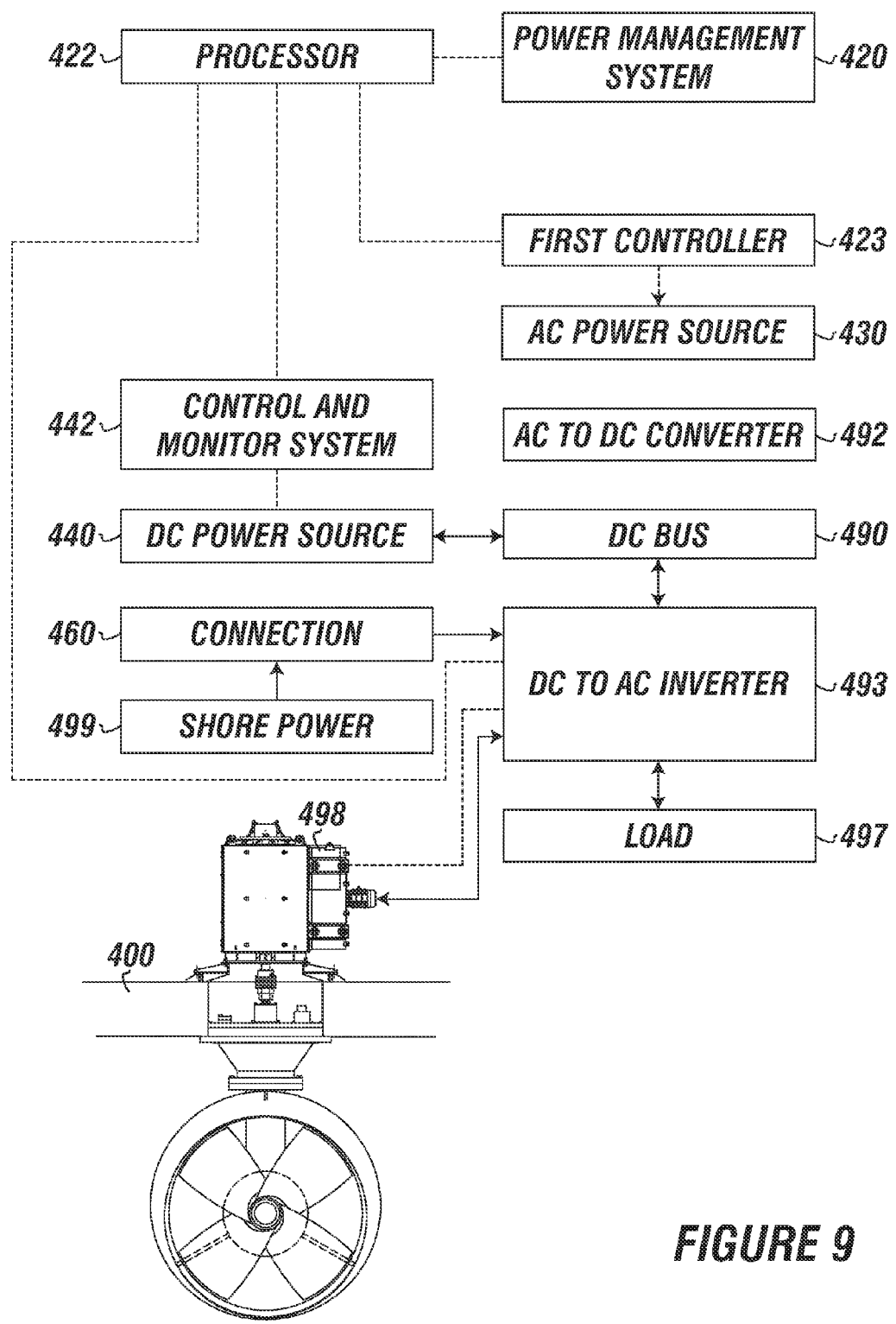
FIG. 9 depicts the vessel of FIG. 6 when the power system is in a docked mode according to one or more embodiments.

FIG. 9 depicts the vessel of FIG. 1 when the power system is in a docked mode according to one or more embodiments.

The AC power source 430 and the DC power source 440 can be prevented from outputting power, and shore power 499 can be communicated with the connection 460 to provide power to all the loads required to operate the vessel and to charge the DC power supply 440.

Figure 10:
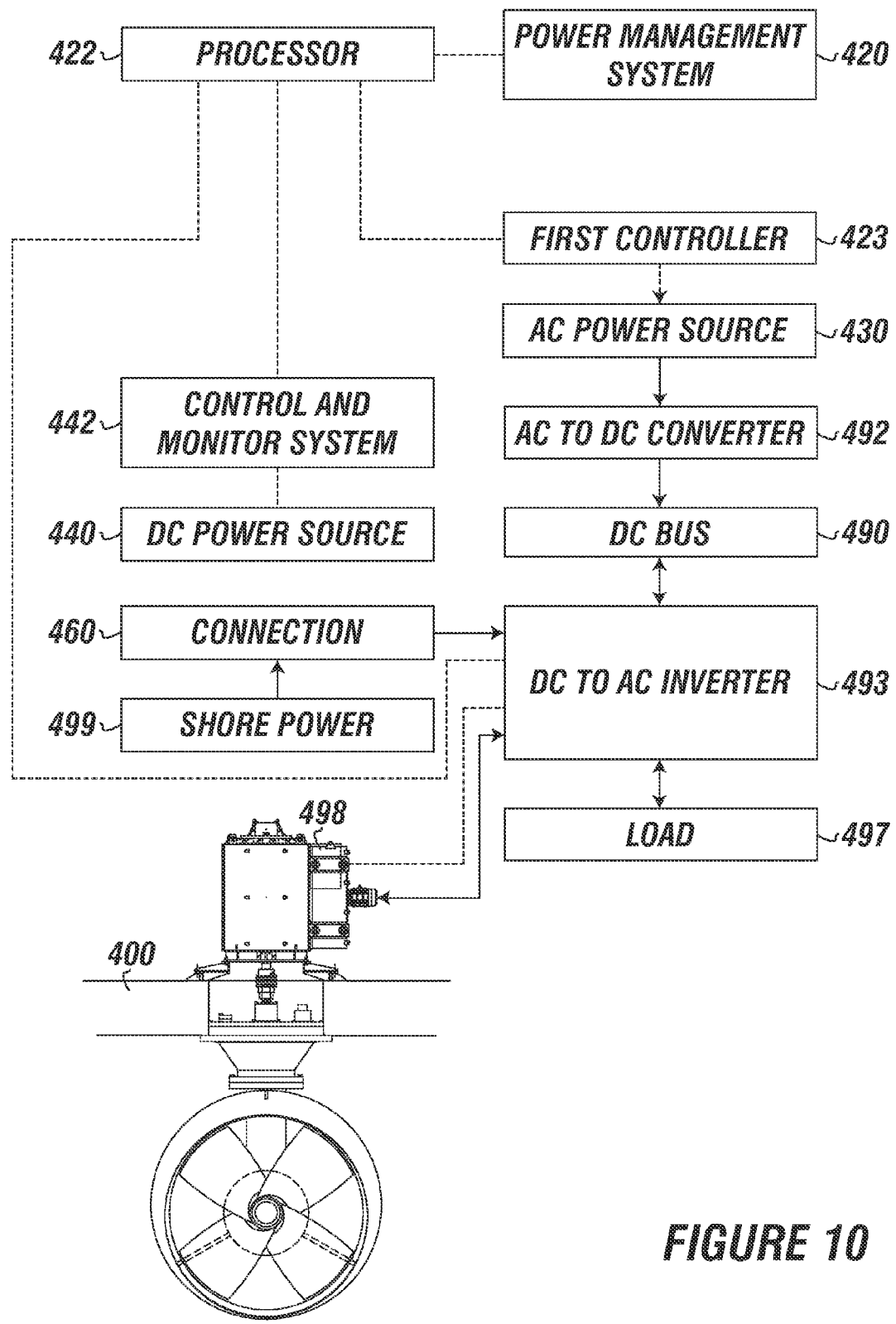
FIG. 10 depicts the vessel of FIG. 6 when the power system is in a maintenance mode according to one or more embodiments.

FIG. 10 depicts the vessel of FIG. 1 when the power system is in a maintenance mode according to one or more embodiments. In this mode the AC power source 430 can be excited preventing current from discharging from the DC power source 440, and the AC power source 430 can power all the loads required to operate the vessel. In one or more embodiments, a circuit breaker (not shown) can be used to remove the DC power supply 440 from the power system.

While these embodiments have been described with emphasis on the embodiments, it should be understood that within the scope of the appended claims, the embodiments might be practiced other than as specifically described herein.

What is claimed is:

1. A non-transitory computer readable medium having computer instructions stored thereon for operating a vessel, wherein the computer instructions comprise:
   a. computer instructions for monitoring a DC power source, wherein the DC power source comprises a plurality of battery cells, and wherein monitoring the DC power source includes acquiring a charge on each battery cell of the plurality of battery cells and maintaining a state of charge of each battery cell of the plurality of battery cells within a preset limit of one another;
   b. computer instructions for determining a most efficient power source to power the vessel;
   c. computer instructions for controlling an AC power source to allow transfer of power solely from the DC power source to power the vessel, transfer of power solely from the AC power source to power the vessel; or transfer of power from both the AC power source and the DC power source to power the vessel;
   d. computer instructions to determine when the DC power source is at a predetermined level; and
   e. computer instructions for controlling auxiliary devices of the vessel.

2. The computer readable medium of claim 1, further comprising computer instructions for synchronizing the AC power source with an additional AC power source.

3. The computer readable medium of claim 1, further comprising computer instructions for harvesting energy from electrical rotating sources.

4. The computer readable medium of claim 1, further comprising computer instructions for monitoring the AC power source and the DC power source needed for all loads.

5. The computer readable medium of claim 4, further comprising instructions for comparing power needed for all loads against each individual power source.

6. A non-transitory computer readable medium having computer instructions stored thereon for operating a vessel, wherein the computer instructions comprise:
   a. computer instructions for monitoring a DC power source, wherein the DC power source comprises a plurality of battery cells, and wherein monitoring the DC power source includes acquiring a charge on each battery cell of the plurality of battery cells and maintaining a state of charge of each battery cell of the plurality of battery cells within a preset limit of one another;
   b. computer instructions for determining a most efficient power source to power the vessel;
   c. computer instructions for controlling an AC power source to allow transfer of power solely from the DC power source to power the vessel, transfer of power solely from the AC power source to power the vessel; or transfer of power from both the AC power source and the DC power source to power the vessel;
   d. computer instructions to determine when the DC power source is at a predetermined level;

e. computer instructions for controlling auxiliary devices of the vessel;
f. computer instructions for monitoring the amount of power needed for all loads; and
g. computer instructions for comparing the power needed for all loads against each individual power source.

7. The computer readable medium of claim 6, further comprising computer instructions for synchronizing the AC power source with an additional AC power source.

8. The computer readable medium of claim 6, further comprising computer instructions for harvesting energy from electrical rotating sources.

9. A non-transitory computer readable medium having computer instructions stored thereon for operating a vessel, wherein the computer instructions comprise:
   a. computer instructions for monitoring a DC power source, wherein the DC power source comprises a plurality of battery cells, and wherein monitoring the DC power source includes acquiring a charge on each battery cell of the plurality of battery cells and maintaining a state of charge of each battery cell of the plurality of battery cells within a preset limit of one another;
   b. computer instructions for determining a most efficient power source from a plurality of power sources comprising the DC power source and an AC power source to power the vessel; and
   c. computer instructions for controlling the AC power source to allow transfer of power solely from the DC power source to power the vessel, transfer of power solely from the AC power source to power the vessel; or transfer of power from both the AC power source and the DC power source to power the vessel.

10. The computer readable medium of claim 9, further comprising computer instructions for synchronizing the AC power source with an additional AC power source.

11. The computer readable medium of claim 9, further comprising computer instructions for harvesting energy from electrical rotating sources.

* * * * *